US009876316B2

(12) United States Patent
Sugiura et al.

(10) Patent No.: US 9,876,316 B2
(45) Date of Patent: Jan. 23, 2018

(54) ELECTRONIC DEVICE

(71) Applicant: Kabushiki Kaisha Toshiba, Tokyo (JP)

(72) Inventors: Yuusuke Sugiura, Ome (JP); Toshikatsu Nakamura, Akishima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/450,072

(22) Filed: Aug. 1, 2014

(65) Prior Publication Data
US 2015/0104962 A1 Apr. 16, 2015

Related U.S. Application Data

(60) Provisional application No. 61/889,455, filed on Oct. 10, 2013.

(51) Int. Cl.
*H01R 13/639* (2006.01)
*G06F 1/16* (2006.01)

(52) U.S. Cl.
CPC ......... *H01R 13/639* (2013.01); *G06F 1/1679* (2013.01); *G06F 1/1681* (2013.01); *H01R 2201/06* (2013.01)

(58) Field of Classification Search
CPC .................... H01R 13/639; H01R 2201/06
USPC ........................................ 439/153
See application file for complete search history.

(56) References Cited

U.S. PATENT DOCUMENTS

| | | | | |
|---|---|---|---|---|
| 4,957,450 A * | 9/1990 | Pioszak | ............. | H01R 13/6392 439/369 |
| 5,017,149 A * | 5/1991 | Hatanaka | ......... | H01R 13/62994 439/157 |
| 5,133,671 A * | 7/1992 | Boghosian | ............. | G09F 3/037 24/16 PB |
| 6,099,330 A * | 8/2000 | Gundermann | ... | H01R 13/62944 439/157 |
| 6,217,366 B1 * | 4/2001 | Weisstock | .......... | H01R 13/6392 439/367 |
| 6,309,244 B1 * | 10/2001 | Gundermann | ......... | H01R 31/08 439/507 |
| 8,986,025 B2 * | 3/2015 | Li | .......................... | H01R 43/26 439/160 |
| 9,553,401 B2 * | 1/2017 | Mathews | ............. | H01R 12/772 |

(Continued)

FOREIGN PATENT DOCUMENTS

| | | |
|---|---|---|
| JP | 03-060791 | 6/1991 |
| JP | 2008-112700 | 5/2008 |
| JP | 2009-280103 | 12/2009 |

*Primary Examiner* — Alexander Gilman
(74) *Attorney, Agent, or Firm* — Rutan & Tucker, LLP

(57) ABSTRACT

According to one embodiment, an electronic device includes a first connector, a second connector, a engage portion, and a fixing portion. The second connector is configured to be connected to the first connector. The engage portion is in the first connector and movable between a first position where the engage portion is configured to engage the second connector and a second position where the engage portion is configured to disengage the second connector. The fixing portion is configured to be attached to the first and the second connectors to fix the first connector to the second connector, and to be separated from the second connector to move the engage portion from the first position to the second position.

11 Claims, 13 Drawing Sheets

(56) References Cited

U.S. PATENT DOCUMENTS

| | | | |
|---|---|---|---|
| 2004/0023535 A1* | 2/2004 | Gundermann | H01R 13/62944 439/157 |
| 2004/0192090 A1* | 9/2004 | Flowers | H01R 13/5812 439/157 |
| 2006/0051993 A1* | 3/2006 | Dillon | H01R 13/62933 439/157 |
| 2015/0104962 A1* | 4/2015 | Sugiura | H01R 13/639 439/153 |

* cited by examiner

ELECTRONIC DEVICE

CROSS-REFERENCE TO RELATED APPLICATIONS

This application claims the benefit of U.S. Provisional Patent Application No. 61/889,455, filed Oct. 10, 2013, the entire contents of which are incorporated by reference.

FIELD

Embodiments described herein relate generally to an electronic device.

BACKGROUND

In electronic devices, connectors are connected to corresponding connectors.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various Embodiments will be described hereinafter with reference to the accompanying drawings. In general, according to an embodiment of the present invention, an electronic device comprises a first connector, a second connector, a engage portion, and a fixing portion. The second connector is configured to be connected to the first connector. The engage portion is in the first connector and is movable between a first position where the engage portion is configured to engage the second connector and a second position where the engage portion is configured to disengage the second connector. The fixing portion is configured to be attached to the first and the second connectors to fix the first connector to the second connector and to be separated from the second connector to move the engage portion from the first position to the second position.

The following describes a first embodiment with reference to FIGS. 1 to 5. In the present specification, directions are basically defined as follows: a side near a user is the front direction, a side away from the user is the back direction, the left side viewed from the user is the left direction, the right side viewed from the user is the right direction, the upper side viewed from the user is the upper direction, and the lower side viewed from the user is the lower direction. The elements in the embodiment and the explanations thereof may be described by a plurality of expressions. Any expressions other than the expressions described herein of the elements and explanations thereof are applicable. In addition, any expressions other than the expressions described herein of the elements and explanations thereof that are not described by multiple expressions are applicable.

Figure 1:
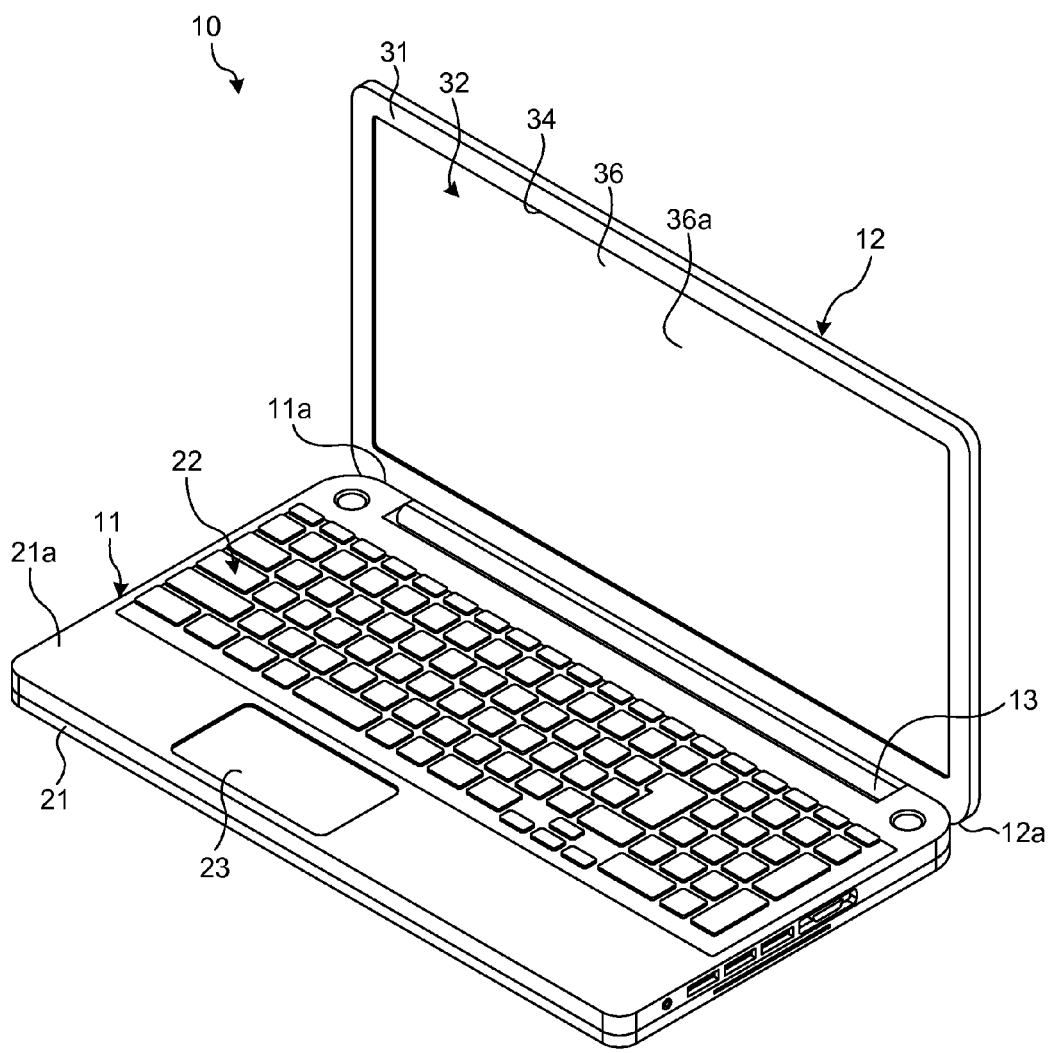
FIG. 1 is an exemplary perspective view illustrating a portable computer according to a first embodiment.

FIG. 1 is a perspective view illustrating a portable computer 10. The portable computer 10 is an example of the electronic device. The electronic device is not limited to the portable computer 10, the electronic device may be another electronic device such as a television receiver, a display, a smartphone, a mobile phone, a tablet device, audio equipment, a game machine, a car navigation system, or a printer.

As illustrated in FIG. 1, the portable computer 10 comprises a base portion 11 and a display portion 12. A lower end portion 12a of the display portion 12 is rotatably coupled to a back end portion 11a of the base portion 11 through a hinge 13. The display portion 12 is configured to move between a close position where the display portion 12 covers the base portion 11 and an open position where the display portion 12 stands from the base portion 11, for example.

The base portion 11 comprises a base housing 21, a keyboard 22, and a touch pad 23. The base housing 21 houses a mother board on which various electronic components such as a central processing unit (CPU) and a memory are mounted, a storage device such as a hard disk drive (HDD) or a solid state drive (SSD), a battery, and various components. The keyboard 22 and the touch pad 23 are input devices arranged on an upper surface 21a of the base housing 21.

The display portion 12 comprises a display housing 31 and a display module 32. The display housing 31 houses the display module 32 and various components. The display housing 31 comprises a display opening 34. The display opening 34 exposes the display module 32.

Figure 2:
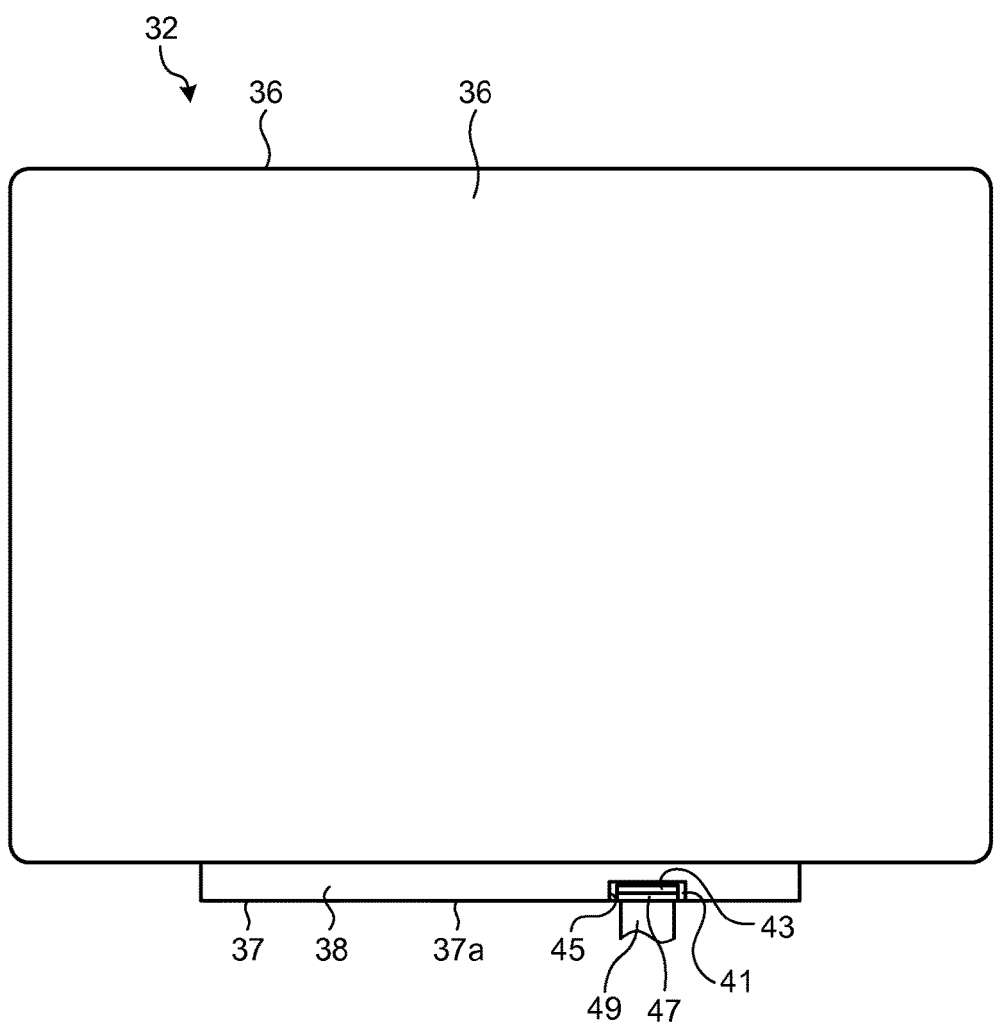
FIG. 2 is an exemplary plan view illustrating a display module in the first embodiment.

FIG. 2 is a plan view illustrating the display module 32. The display module 32 is a liquid crystal display (LCD), for example. The display module 32 is not limited to this example and may be another display such as an organic electroluminescent (OEL) display, a plasma display, or electronic paper.

The display module 32 comprises a panel 36 and a substrate 37. The substrate 37 is an example of the component. The component is not limited to the substrate 37 and may be another component such as a housing. The panel 36 comprises a screen 36a. The substrate 37 controls the display module 32 to cause the screen 36a to display an image thereon. In the specification, the "image" includes a moving image, a still image, and colors. The screen 36a is exposed outside the display housing 31 from the display opening 34.

The substrate 37 is attached to the panel 36. The substrate 37 is a printed circuit board (PCB), for example. The substrate 37 is not limited to this example and may be another substrate such as a flexible printed circuit board (FPC), for example. The substrate 37 is covered with a shield 38. The shield 38 is metallic foil that is grounded, for example.

The substrate 37 comprises a mounting face 41. The mounting face 41 is an example of a surface of the component. A female connector 43 is mounted on the mounting face 41. The female connector 43 is an example of the second connector, the female connector 43 can also be referred to as a receptacle connector, a connecting portion, a coupling portion, or a combining portion, for example. In other words, the female connector 43 is attached to the substrate 37.

The shield 38 has an exposing portion 45. The exposing portion 45 is an opening provided to the shield 38. The female connector 43 is exposed outside the shield 38 from the exposing portion 45. In other words, the exposing portion 45 is a hole surrounding the female connector 43.

A male connector 47 is connected to the female connector 43. The male connector 47 is an example of the first connector, the male connector 47 can also be referred to as a plug connector, a connecting portion, a coupling portion, or a combining portion, for example. As a result of the connection of the male connector 47 to the female connector 43, terminals of the male connector 47 and the terminals of the female connector 43 are electrically connected. The male connector may be mounted to the substrate 37 and the female connector may be connected to the male connector.

A harness 49 extends from the male connector 47. The harness 49 can also be referred to as a cable, wiring, or an extending portion, for example. Instead of the harness 49, another component such as an FPC may extend from the male connector 47.

The harness 49 passes through the hinge 13 and is connected to the mother board housed in the base housing 21. The harness 49 is provided from the base portion 11 to the display portion 12. The harness 49 electrically connects the mother board to the display module 32.

Figure 3:
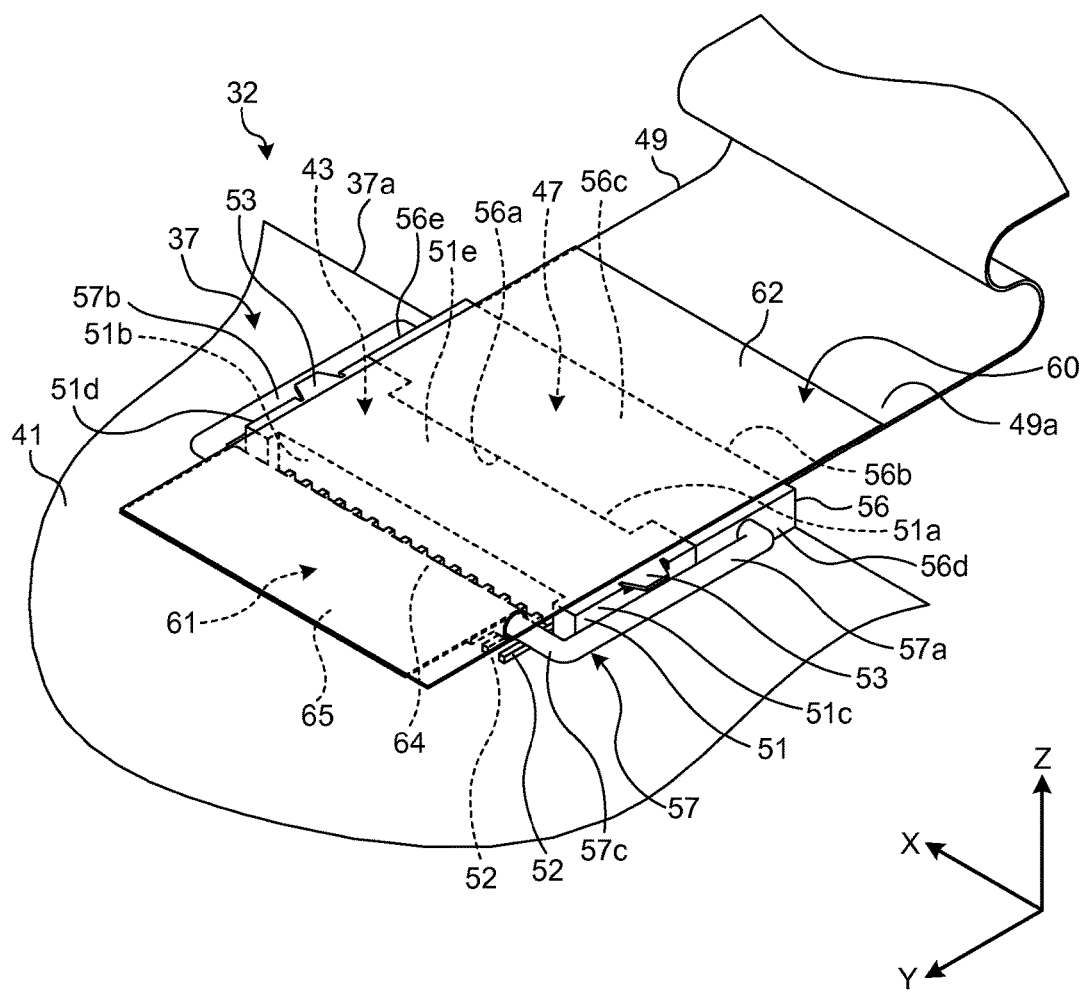
FIG. 3 is an exemplary perspective view illustrating a portion of the display module in the first embodiment.

FIG. 3 is a perspective view illustrating a portion of the display module 32 in the vicinity of the female connector 43 and the male connector 47. As illustrated in FIG. 3, the male connector 47 is attached to the female connector 43 in a direction substantially in parallel with the mounting face 41.

As illustrated in drawings, the X axis, the Y axis, and the Z axis are defined in the specification. The X, Y, and Z axes are orthogonal to each other. The X axis is along an edge 37a of the substrate 37. The edge 37a of the substrate 37 faces the lower end portion 12a of the display portion 12. The Y axis is along a direction in which the male connector 47 is connected to the female connector 43. The Z axis is along the thickness of the substrate 37.

The female connector 43 comprises a first casing 51, a plurality of leads 52, and a pair of stoppers 53. The leads 52 are an example of a conducting portion, the leads 52 can also be referred to as terminals or a connecting portion, for example. The stoppers 53 can also be referred to as a locking portion or a engage portion, for example.

The first casing 51 is formed in an substantially quadrangular box shape. A first end portion 51a of the first casing 51 is along the X axis and faces the edge 37a of the substrate 37. The first end portion 51a of the first casing 51 is provided with an insertion inlet. The male connector 47 is inserted into the insertion inlet.

The first casing 51 is made of metal, for example. The first casing 51 is electrically connected to a ground pattern provided to the substrate 37. The first casing 51 may be formed of another material such as a resin.

The leads 52 extend from a second end portion 51b of the first casing 51 in a direction along the Y axis respectively. The second end portion 51b is opposite the first end portion 51a. The leads 52 are electrically connected to lands provided on the mounting face 41 with solder, for example. As a result of soldering the leads 52 to the lands, the female connector 43 is fixed to the substrate 37.

Each of the stoppers 53 is provided in the first casing 51. The stoppers 53 protrude from a first side portion 51c and a second side portion 51d of the first casing 51 respectively. The first side portion 51c and the second side portion 51d extend along the Y axis. The second side portion 51d is opposite the first side portion 51c. The stoppers 53 are provided to be separated from the mounting face 41 of the substrate 37.

The male connector 47 comprises a second casing 56. The second casing 56 is formed in an substantially quadrangular box shape. A first end portion 56a of the second casing 56 is provided with an insertion portion. The insertion portion is inserted into the insertion inlet of the first casing 51 of the female connector 43. The terminals provided to the insertion portion are electrically connected to the terminals provided in the insertion inlet. The first end portion 56a of the second casing 56 is along the X axis in a state where the male connector 47 is attached to the female connector 43.

The second casing 56 is made of metal, for example. The second casing 56 is electrically connected to the ground pattern of the substrate 37 directly or through the first casing 51. The second casing 56 may be formed of another material such as a resin.

The harness 49 extends from a second end portion 56b of the second casing 56 in a direction approximately along the Y axis. The second end portion 56b is opposite the first end portion 56a. A surface 49a of the harness 49 substantially continues to an upper face 56c of the second casing 56. Furthermore, the upper face 56c of the second casing 56 substantially continues to an upper face 51e of the first casing 51 of the female connector 43. Thus, the upper face 51e of the first casing 51, the upper face 56c of the second casing 56, and the surface 49 of the harness 49 form a flat face. The surface 49a of the harness 49, the upper face 51e of the first casing 51, and the upper face 56c of the second casing 56 face a side opposite the side facing the mounting face 41.

A locking lever 57 is provided to the male connector 47. The locking lever 57 is an example of the engage portion, the locking lever 57 can also be referred to as a lever, a moving portion, a locking portion, an engaging portion, or a fixing portion, for example. The engage portion is not limited to the locking lever 57, the engage portion may be another component such as a pin, for example.

The locking lever 57 is formed of a bended metallic bar, for example. The locking lever 57 may be formed of another material. The locking lever 57 comprises a first portion 57a, a second portion 57b, and a third portion 57c. The first portion 57a, the second portion 57b, and the third portion 57c are examples of a engage section.

In the state illustrated in FIG. 3, the first portion 57a and the second portion 57b extend along the Y axis. The first portion 57a thus extends in parallel with the second portion 57b. The third portion 57c extends along the X axis. The third portion 57c thus extends in a direction intersecting with the first portion 57a and the second portion 57b.

One end of the first portion 57a of the locking lever 57 is attached to a first side portion 56d of the second casing 56. One end of the second portion 57b of the locking lever 57 is attached to a second side portion 56e of the second casing 56. The second side portion 56e is opposite the first side portion 56d. The first side portion 56d and the second side portion 56e extend along the Y axis.

The third portion 57c of the locking lever 57 connects the other end of the first portion 57a and the other end of the second portion 57b. In other words, the first portion 57a and the second portion 57b extend from the respective ends of the third portion 57c. In this way, the locking lever 57 is formed in an substantially U-like shape. The locking lever 57 may be formed in another shape.

Figure 4:
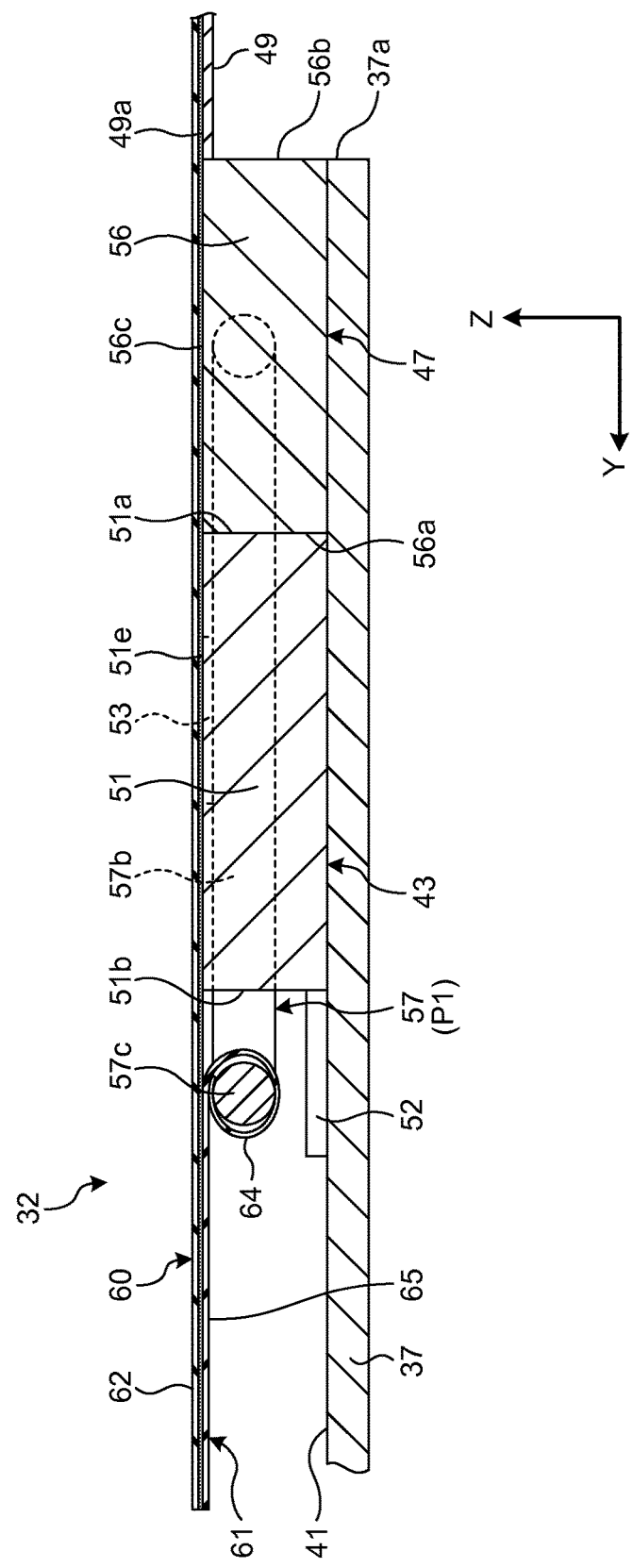
FIG. 4 is an exemplary cross-sectional view illustrating a portion of the display module in a state where a locking lever is at a first position, in the first embodiment.
Figure 5:
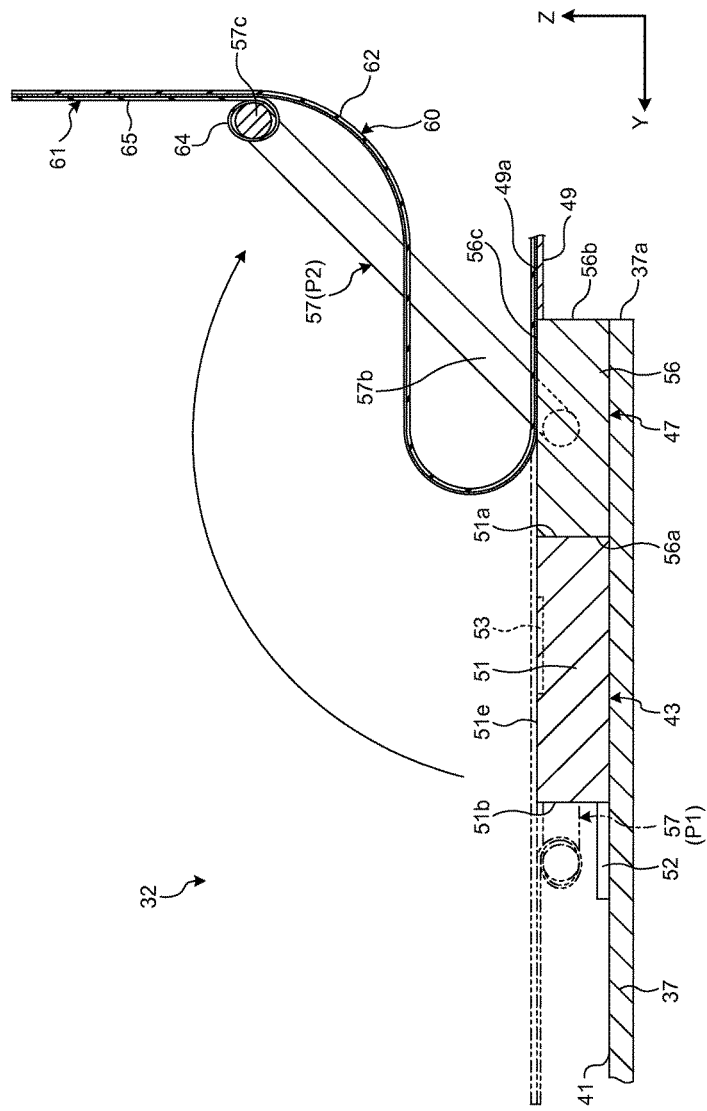
FIG. 5 is an exemplary cross-sectional view illustrating a portion of the display module in a state where the locking lever is at a second position, in the first embodiment.

FIG. 4 is a cross-sectional view illustrating a portion of the display module 32 in a state where the locking lever 57 is at a first position P1. FIG. 5 is a cross-sectional view illustrating a portion of the display module 32 in a state where the locking lever 57 is at a second position P2. In FIG. 5, the locking lever 57 at the first position P1 is indicated with the chain double-dashed line.

The locking lever 57 can be rotated with respect to the male connector 47. The locking lever 57 is configured to move between the first position P1 and the second position P2 by being rotated.

As illustrated in FIG. 4, when the locking lever 57 is at the first position P1, the first portion 57a and the second portion 57b of the locking lever 57 catch the respective stoppers 53 of the female connector 43. In addition, the second end portion 51b of the first casing 51 faces the third portion 57c of the locking lever 57. Then, the mounting face 41 of the substrate 37 also faces the third portion 57c of the locking lever 57.

The locking lever 57 fixes the male connector 47 in such a state that the male connector 47 is connected to the female connector 43 by engaging the female connector 43. In other words, the locking lever 57 locks the male connector 47 to the female connector 43. The locking lever 57 prevents the male connector 47 from separating from the female connector 43 with the third portion 57c engaging the second end portion 51b of the first casing 51, for example.

As illustrated in FIG. 5, when the locking lever 57 is at the second position P2, the locking lever 57 disengages the female connector 43. Thus, the male connector 47 can be removed from the female connector 43 when the locking lever 57 is at the second position P2. When the locking lever 57 moves from the first position p1 to the second position P2, the first portion 57a and the second portion 57b of the locking lever 57 pass over the stoppers 53. In other words, the stoppers 53 are between the first position P1 and the second position P2.

As illustrated in FIG. 4, a fixing portion 60 is attached to the female connector 43 and the male connector 47. The fixing portion 60 can also be referred to as an attaching portion, a locking portion, a fastening portion, a reinforcing portion, an insulator, or a tape, for example. In the first embodiment, the fixing portion 60 comprises a first member 61 and a second member 62.

The first member 61 is a flexible sheet, which is made of a material having insulation property such as polyester, for example. The first member 61 may be made of another material. The first member 61 comprises a first attaching portion 64 and a second attaching portion 65. The first attaching portion 64 and the second attaching portion 65 can also be referred to as portions, sections, or areas, for example.

The first attaching portion 64 is attached to the third portion 57c by being wound around the third portion 57c of the locking lever 57. In other words, the first attaching portion 64 wraps the third portion 57c. The first attaching portion 64 is thus a portion of the first member 61, which is fastened with a double-sided adhesive tape, for example, in the state where the first attaching portion 64 is wound around the third portion 57c.

A portion of the first attaching portion 64 is between the third portion 57c of the locking lever 57 at the first position P1 and the leads 52 on the mounting face 41 of the substrate 37. The portion of the first attaching portion 64 insulates the third portion 57c from the leads 52. The portion of the first attaching portion 64 also insulates the third portion 57c from wiring patterns provided on the mounting face 41.

The second attaching portion 65 continues from the first attaching portion 64. The second attaching portion 65 extends from the first attaching portion 64 toward a side opposite the female connector 43. The second attaching portion 65 may extend in another direction. The first attaching portion 64 rotating with respect to the third portion 57c of the locking lever 57 allows the second attaching portion 65 to also rotate with respect to the third portion 57c.

The second member 62 is a flexible sheet, which is made of a material having insulation property such as polyester, for example. The second member 62 is stuck on the upper face 51e of the first casing 51 and the upper face 56c of the second casing 56 with a double-sided adhesive tape, for example. The second member 62 is thus attached to the female connector 43 and the male connector 47.

The second member 62 fixes the female connector 43 in such a state that the female connector 43 is connected to the male connector 47 by sticking on the female connector 43 and the male connector 47 that are connected to each other. The second member 62 prevents the male connector 47 from separating from the female connector 43 with adhesion force.

In addition, the second member 62 is stuck on the second attaching portion 65 of the first member 61 with a double-sided adhesive tape, for example. The second member 62 may be furthermore stuck on the first attaching portion 64.

The sticking force of the second member 62 to the first member 61 is equal to or larger than the sticking force of the second member 62 to the female connector 43 and the male connector 47. It is noted that, the sticking force of the second member 62 to the first member 61 may be smaller than the sticking force of the second member 62 to the female connector 43 and the male connector 47.

The second attaching portion 65 of the first member 61 and the second member 62 stuck on the second attaching portion 65 extend toward a direction approximately along the Y axis. The first member 61 and the second member 62 may extend in another direction.

The second member 62 is furthermore stuck on the surface 49a of the harness 49 with a double-sided adhesive tape, for example. The second member 62 may be a portion of the harness 49. An insulation layer that forms the FPC may be the second member 62 in case the FPC is attached to the male connector 47 instead of the harness 49. In other words, the second member 62 may be integrated with the FPC.

The male connector 47 is removed from the female connector 43 in the following manner, for example. It is noted that, the manner to remove the male connector 47 from the female connector 43 is not limited to the manner described below.

The second attaching portion 65 of the first member 61 and the second member 62 stuck on the second attaching portion 65 are pinched by an operator, for example. As illustrated in FIG. 5, the locking lever 57 is rotated when the first member 61 and the second member 62 are pulled by the operator in a direction along the Z axis, for example. Thus, the first attaching portion 64 of the first member 61 pushes the third portion 57c of the locking lever 57 from the first position P1 toward the second position P2. In other words, the first attaching portion 64 causes a force to act on the locking lever 57 to move the locking lever 57 from the first position P1 to the second position P2.

The second position P2 is further away from the mounting face 41 of the substrate 37 than the first position P1. As a result of the rotation, the locking lever 57 moves away from the substrate 37. It is noted that, the second position is not limited to this example, the second position may be closer to the mounting face 41 of the substrate 37 than the first position is.

When the first member 61 and the second member 62 are pulled, the second member 62 of the fixing portion 60 is peeled from the female connector 43. In other words, the second member 62 of the fixing portion 60 is separated from the female connector 43 together with the locking lever 57.

Separating the second member 62 of the fixing portion 60 from the female connector 43 leads to the movement of the locking lever 57 from the first position P1 to the second position P2. Separated from the female connector 43, the fixing portion 60 causes the locking lever 57 to move from the first position P1 to the second position P2. In other words, the fixing of the male connector 47 to the female connector 43 by the locking lever 57 and the fixing portion 60 is released simply by pulling of the fixing portion 60.

The action described above can be expressed in another way. For example, in the state where the second member 62 is attached to the female connector 43, a portion of the first attaching portion 64 is on a side opposite the second position P2 with respect to the third portion 57c of the locking lever 57 at the first position P1. When the first member 61 and the second member 62 are pulled, the portion of the first attaching portion 64 lifts up the third portion 57c of the locking lever 57 and causes the locking lever 57 to move to the second position P2. In the state where the second member 62 is separated from the female connector 43, the portion of the first attaching portion 64 is on a side of the second position P2 with respect to the first position P1.

As described above, moving to the second position P2, the locking lever 57 disengages the female connector 43. The male connector 47 is removed from the female connector 43 by being pulled in a direction along the Y axis by an operator, for example.

The second member 62 of the fixing portion 60 may be fixed to the male connector 47 with a pin or an adhesive, for example. In this case, the fixing portion 60 having caused the locking lever 57 to move from the first position P1 to the second position P2 is further pulled, resulting in the male connector 47 being removed from the female connector 43. The male connector 47 is removed from the female connector 43 simply by pulling of the fixing portion 60.

In the portable computer 10 in the first embodiment, the fixing portion 60 fixes the male connector 47 to the female connector 43. In addition, the fixing portion 60 is separated from the female connector 43 to move the locking lever 57 from the first position P1 to the second position P2. In this way, the fixing portion 60 is configured to fix the male connector 47 to the female connector 43 and to cause the locking lever 57 to move. The fixing portion 60 thus configured can reduce the number of components of the portable computer 10.

Figure 6:
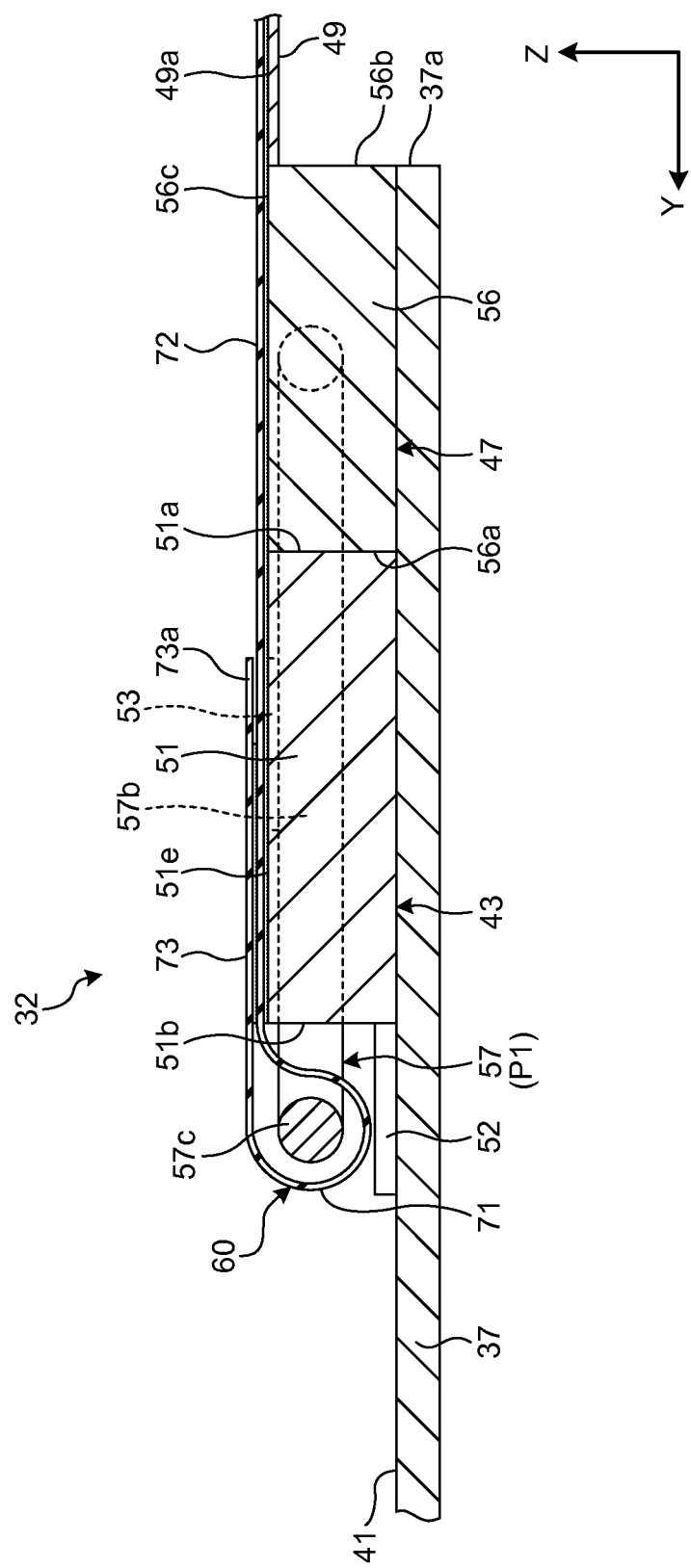
FIG. 6 is an exemplary cross-sectional view illustrating a portion of the display module in a state where the locking lever is at the first position, according to a second embodiment.
Figure 7:
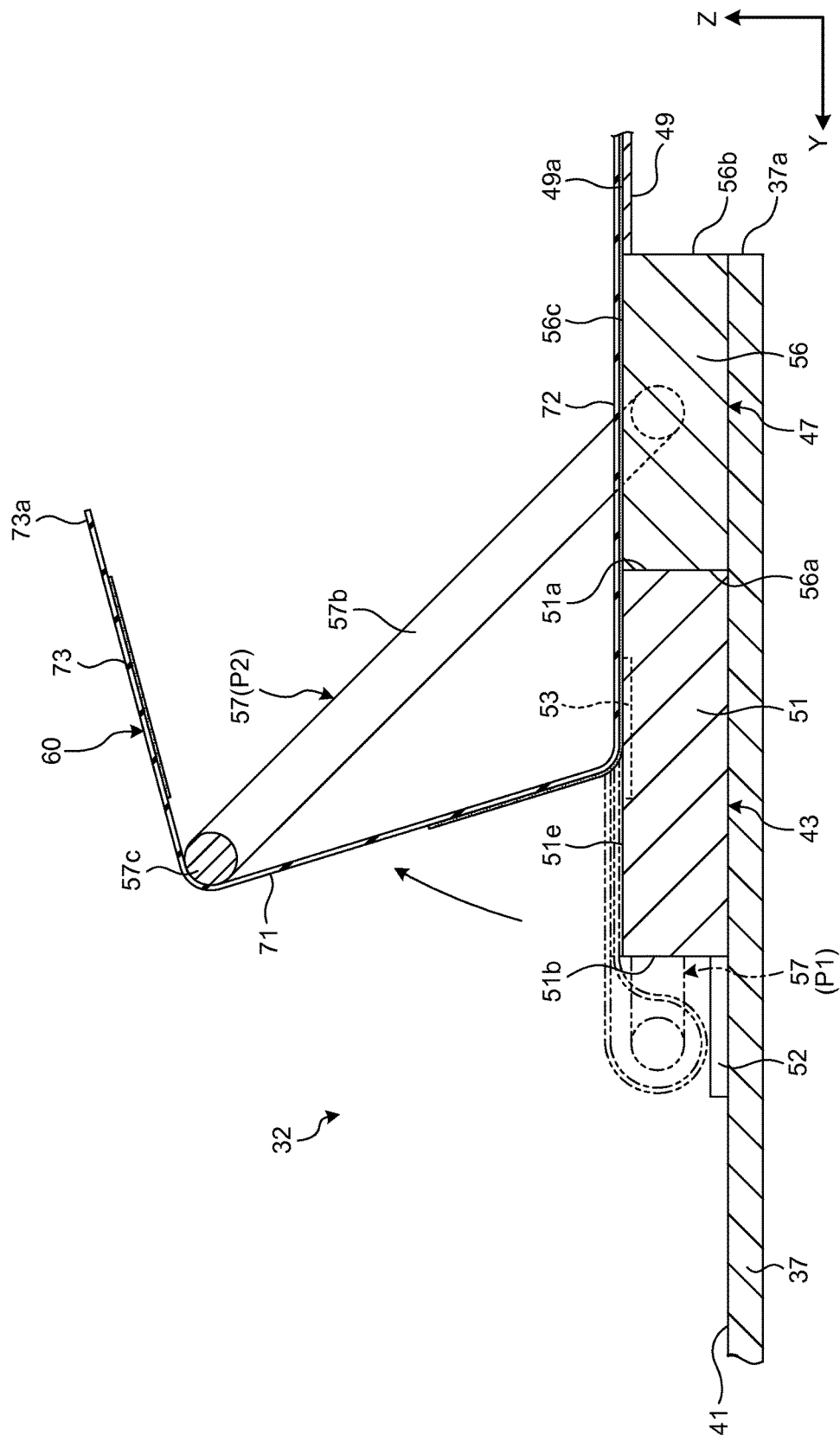
FIG. 7 is an exemplary cross-sectional view illustrating a portion of the display module in a state where the locking lever is at the second position, in the second embodiment.

The following describes a second embodiment with reference to FIGS. 6 and 7. In the following description on the multiple embodiments, elements having the same functions as those of already described elements may be labeled with the same numerals, and descriptions thereof may be omitted. The elements labeled with the same numerals may not have all of the functions and characteristics in common with each other, and may have different functions and characteristics in accordance with the respective embodiments.

FIG. 6 is a cross-sectional view illustrating a portion of the display module 32 in the state where the locking lever 57 is at the first position P1, according to the second embodiment. FIG. 7 is a cross-sectional view illustrating a portion of the display module 32 in the state where the locking lever 57 is at the second position P2. In FIG. 7, the locking lever at the first position P1 is indicated with the chain double-dashed line.

As illustrated in FIG. 6, the fixing portion 60 in the second embodiment is a flexible sheet, which is made of a material having insulation property such as polyester, for example. The fixing portion 60 comprises an intermediate portion 71, a first extending portion 72, and a second extending portion 73. The intermediate portion 71, the first extending portion 72, and the second extending portion 73 can also be referred to as portions, sections, or areas, for example.

The intermediate portion 71 is wound around the third portion 57c of the locking lever 57. In other words, the intermediate portion 71 surrounds the third portion 57c. A portion of the intermediate portion 71 is on a side opposite the second position P2 with respect to the third portion 57c of the locking lever 57 at the first position P1. The portion of the intermediate portion 71 is between the third portion 57c of the locking lever 57 and the substrate 37.

The first extending portion 72 extends from one end of the intermediate portion 71. In other words, the first extending portion 72 continues from the intermediate portion 71. The first extending portion 72 is stuck on the upper face 51e of the first casing 51 and the upper face 56c of the second casing 56 with a double-sided adhesive tape, for example. Attached to the female connector 43 and the male connector 47, the first extending portion 72 fixes the male connector 47 in such a state that the male connector 47 is connected to the female connector 43.

The second extending portion 73 extends from the other end of the intermediate portion 71. The second extending portion 73 is fixed to the first extending portion 72 with a double-sided adhesive tape, for example. In other words, the second extending portion 73 is attached to the female connector 43 via the first extending portion 72 on the female connector 43. A tip portion 73a of the second extending portion 73 is not fixed to the first extending portion 72, and is free.

In another expression, the fixing portion 60 is stuck on the female connector 43 and the male connector 47, and folded back such that the fixing portion 60 turns around the third portion 57c of the locking lever 57. The folded-back portion of the fixing portion 60 is stuck on a portion of the fixing portion 60 stuck on the female connector 43 and the male connector 47.

The male connector 47 in the second embodiment is removed from the female connector 43 in the following manner, for example. The manner to remove the male connector 47 from the female connector 43 is not limited to the manner described below.

The tip portion 73a of the second extending portion 73 is pinched by an operator, for example. The operator readily pinches the tip portion 73a because the tip portion 73a is free. When the tip portion 73a of the second extending portion 73 is pulled in a direction along the Z axis, for example, the second extending portion 73 is peeled from the first extending portion 72.

As illustrated in FIG. 7, when the second extending portion 73 having been peeled from the first extending portion 72 is further pulled, the intermediate portion 71 comes into contact with the third portion 57c of the locking lever 57. The intermediate portion 71 pushes the third portion 57c of the locking lever 57 from the first position P1 toward the second position P2.

The intermediate portion 71 lifts up the locking lever 57, resulting in the first extending portion 72 being peeled from the female connector 43. In other words, the first extending portion 72 of the fixing portion 60 is separated from the female connector 43.

Separating the first extending portion 72 of the fixing portion 60 from the female connector 43 leads to the movement of the locking lever 57 from the first position P1 to the second position P2. Thus, separated from the female connector 43, the fixing portion 60 causes the locking lever 57 to move from the first position P1 to the second position P2.

Moving to the second position P2, the locking lever 57 disengages the female connector 43. The male connector 47 is removed from the female connector 43 by being pulled in a direction along the Y axis by an operator, for example.

Figure 8:
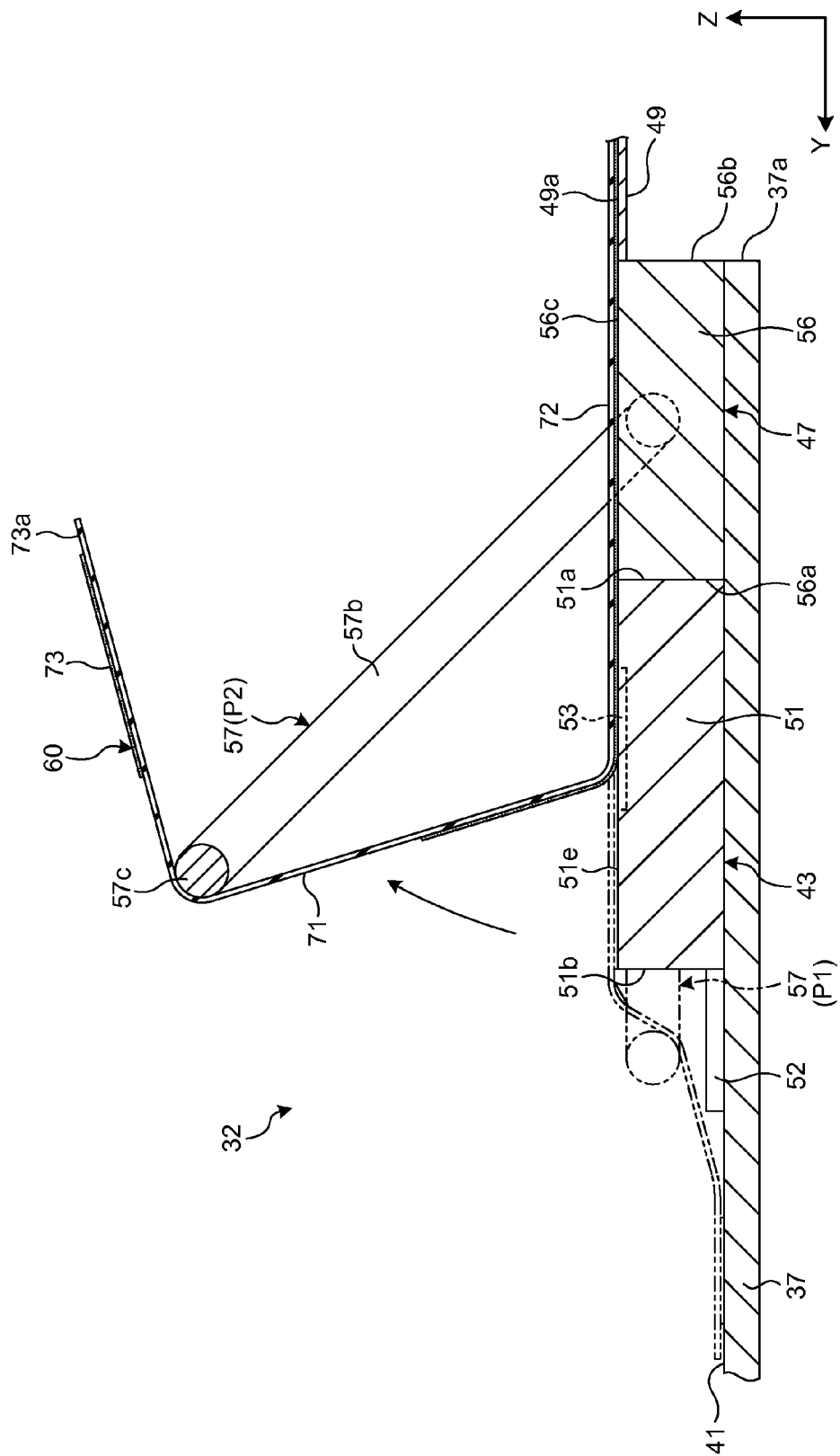
FIG. 8 is an exemplary cross-sectional view illustrating a portion of the display module in a state where the locking lever is at the second position, according to a third embodiment.

The following describes a third embodiment with reference to FIG. 8. FIG. 8 is a cross-sectional view illustrating a portion of the display module 32 in the state where the locking lever 57 is at the second position P2, according to the third embodiment. In FIG. 8, the locking lever 57 at the first position P1 is indicated with the chain double-dashed line.

As illustrated in FIG. 8 with the chain double-dashed line, the second extending portion 73 in the third embodiment is stuck on the mounting face 41 of the substrate 37 with a double-sided adhesive tape, for example. The second extending portion 73 is attached to the substrate 37, not to the first extending portion 72.

In the state where the first extending portion 72 is attached to the female connector 43, a portion of the intermediate portion 71 is on a side opposite the second position P2 with respect to the third portion 57c of the locking lever 57 at the first position P1. The intermediate portion 71 is not wound around the third portion 57c.

When the male connector 47 is removed from the female connector 43, the second extending portion 73 is peeled from the substrate 37 by an operator, for example. The second extending portion 73 having been peeled is pulled in a direction along the Z axis, for example, causing the locking lever 57 to move from the first position P1 to the second position P2 and resulting in the first extending portion 72 being separated from the female connector 43.

Figure 9:
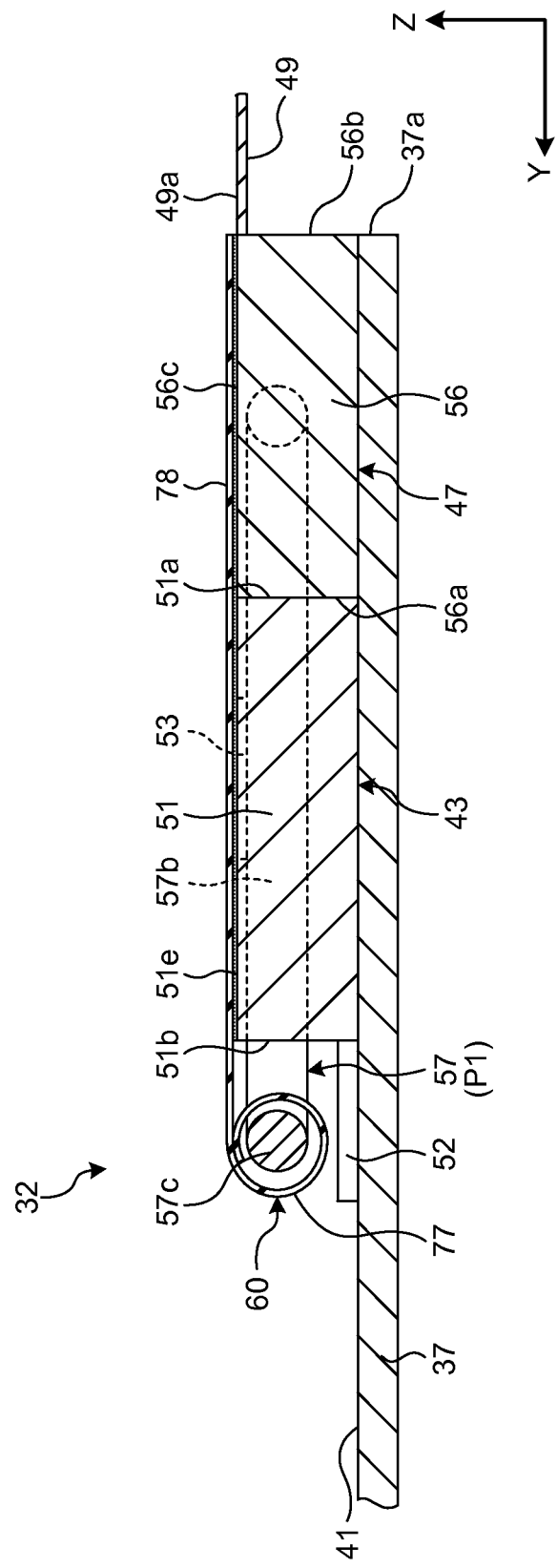
FIG. 9 is an exemplary cross-sectional view illustrating a portion of the display module in a state where the locking lever is at the first position, according to a fourth embodiment.
Figure 10:
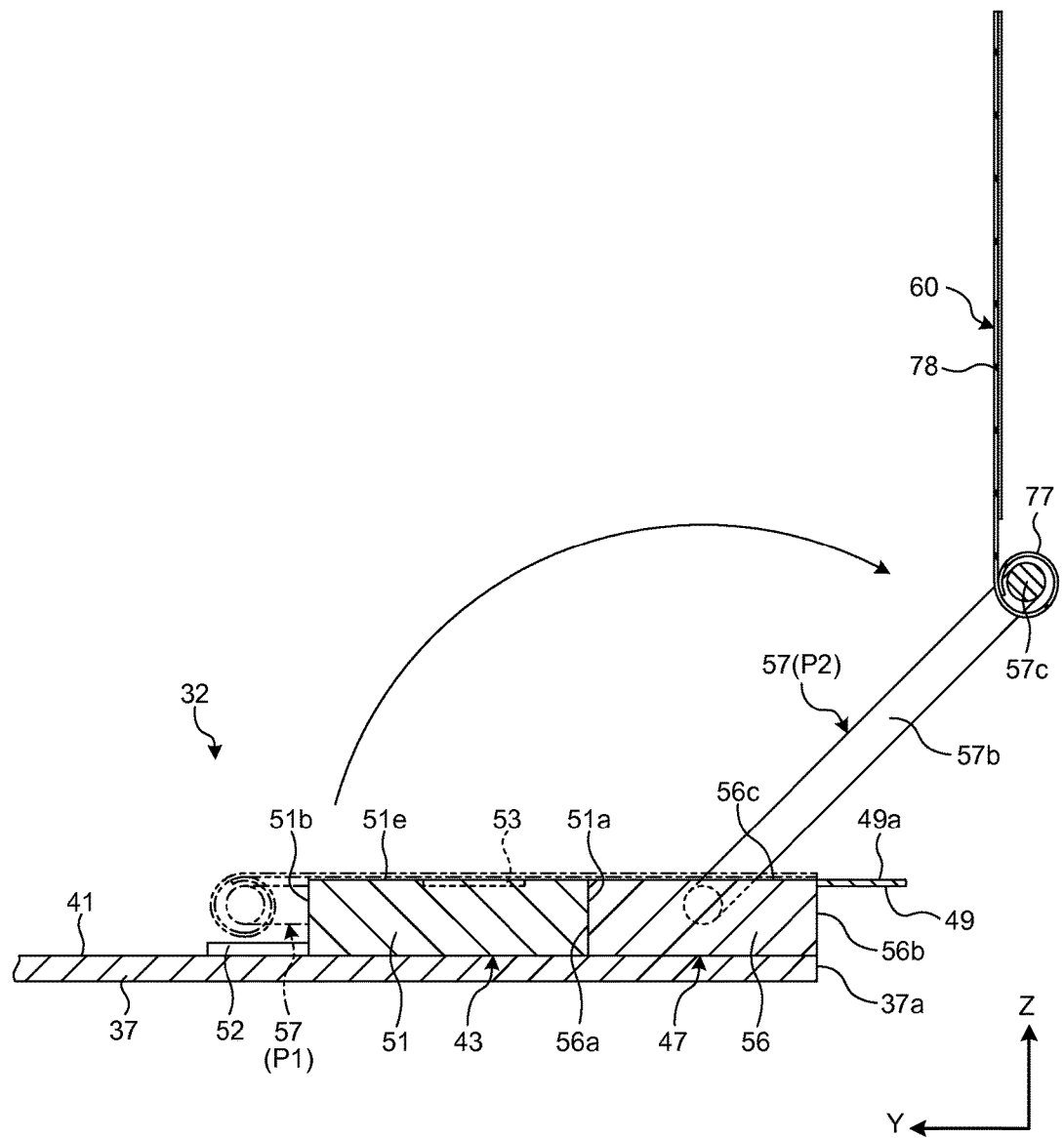
FIG. 10 is an exemplary cross-sectional view illustrating a portion of the display module in a state where the locking lever is at the second position, in the fourth embodiment.

The following describes a fourth embodiment with reference to FIGS. 9 and 10. FIG. 9 is a cross-sectional view illustrating a portion of the display module 32 in the state where the locking lever 57 is at the first position P1, according to the third embodiment. FIG. 10 is a cross-sectional view illustrating a portion of the display module 32 in the state where the locking lever 57 is at the second position P2. In FIG. 10, the locking lever 57 at the first position P1 is indicated with the chain double-dashed line.

As illustrated in FIG. 9, the fixing portion 60 in the fourth embodiment comprises an attaching portion 77 and an extending portion 78. The attaching portion 77 and the extending portion 78 can also be referred to as portions, sections, or areas, for example.

The attaching portion 77 is attached to the third portion 57c by being wound around the third portion 57c of the locking lever 57. The attaching portion 77 is thus a portion of the fixing portion 60, which is fastened with a double-sided adhesive tape, for example, in the state where the portion is wound around the third portion 57c.

The extending portion 78 continues from the attaching portion 77. The extending portion 78 extends from the attaching portion 77 toward the female connector 43. The extending portion 78 is stuck on the upper face 51e of the first casing 51 and the upper face 56c of the second casing 56 with a double-sided adhesive tape, for example. The extending portion 78 fixes the female connector 43 to the male connector 47.

The male connector 47 is removed from the female connector 43 in the following manner, for example. The manner to remove the male connector 47 from the female connector 43 is not limited to the manner described below.

The extending portion 78 is peeled from the male connector 47 and the female connector 43 by an operator, for example. In other words, the extending portion 78 of the fixing portion 60 is separated from the female connector 43.

As illustrated in FIG. 10, the extending portion 78 having been peeled from the male connector 47 and the female connector 43 is pulled in a direction along the Z axis, for example, resulting in the locking lever 57 being rotated. The attaching portion 77 pushes the third portion 57c of the locking lever 57 from the first position P1 toward the second position P2. In other words, the attaching portion 77 causes a force to act on the locking lever 57 to move the locking lever 57 from the first position P1 to the second position P2.

Separating the extending portion 78 of the fixing portion 60 from the female connector 43 leads to the movement of the locking lever 57 from the first position P1 to the second position P2. Separated from the female connector 43, the fixing portion 60 causes the locking lever 57 to move from the first position P1 to the second position P2.

Moving to the second position P2, the locking lever 57 disengages the female connector 43. The male connector 47 is removed from the female connector 43 by being pulled in a direction along the Y axis by an operator, for example.

Figure 11:
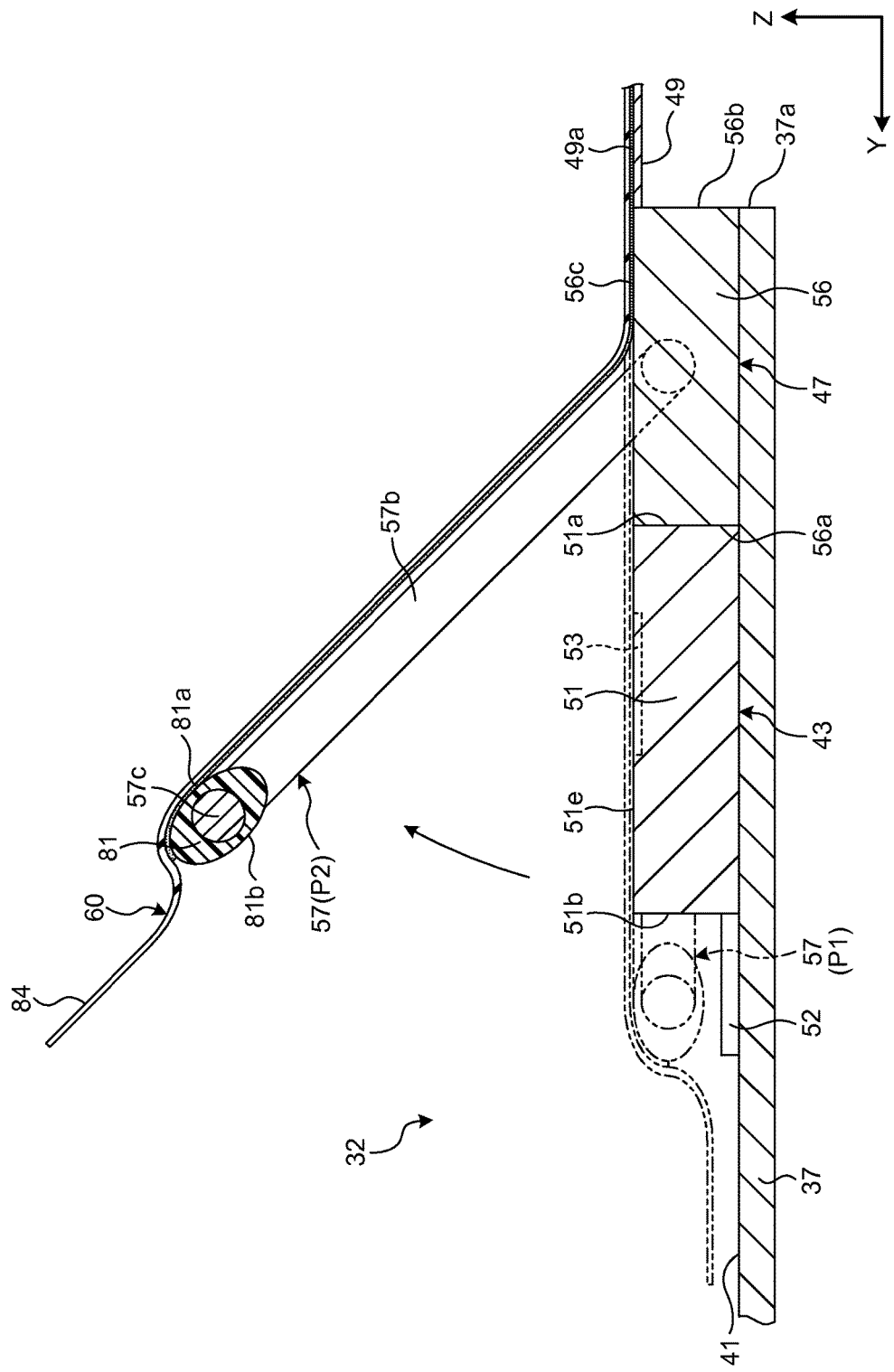
FIG. 11 is an exemplary cross-sectional view illustrating a portion of the display module in a state where the locking lever is at the second position, according to a fifth embodiment.

The following describes a fifth embodiment with reference to FIG. 11. FIG. 11 is a cross-sectional view illustrating a portion of the display module 32 in the state where the locking lever 57 is at the second position P2, according to the fifth embodiment. In FIG. 11, the locking lever 57 at the first position P1 is indicated with the chain double-dashed line.

As illustrated in FIG. 11, the locking lever 57 in the fifth embodiment comprises an expanded portion 81. The expanded portion 81 can also be referred to as a covering portion, a stuck portion, an attached portion, or a coated portion, for example.

The expanded portion 81 is a resin covering the third portion 57c of the locking lever 57. The expanded portion 81 is not limited to this example, the expanded portion 81 may be another member attached to the third portion 57c in a detachable manner, for example.

The expanded portion 81 has a cross section of an ellipse. The circumferential length of the cross section of the expanded portion 81 is larger than that of the cross section of the third portion 57c. The width in the longitudinal direction of the cross section of the expanded portion 81 is larger than the diameter of the third portion 57c. The expanded portion 81 is the portion expanded to be larger than the third portion 57c. The shape of the expanded portion 81 is not limited to this example, the shape of the expanded portion 81 may be another shape such as a cylindrical shape having a radius larger than the third portion 57c, a platy shape, or a wave shape, for example.

The fixing portion 60 is stuck on an upper face 81a of the expanded portion 81 with a double-sided adhesive tape, for example. In other words, the fixing portion 60 is attached to the locking lever 57 by adhesion. The upper face 81a of the expanded portion 81 faces a side opposite the side facing the mounting face 41 of the substrate 37. A lower face 81b, which is opposite the upper face 81a, of the expanded portion 81 faces the mounting face 41, and the fixing portion 60 is not between the locking lever 57 and the mounting face 41. The fixing portion 60 or another member may be between the fixing portion 60 and the mounting face 41.

The fixing portion 60 further comprises a tongue 84. The tongue 84 extends from a portion where the fixing portion 60 is stuck on the expanded portion 81 in a direction opposite the female connector 43. The tongue 84 is not fixed to any other portion, and is free. It is noted that, the tongue 84 may be fixed to another component such as the substrate 37, for example.

The male connector 47 is removed from the female connector 43 in the following manner, for example. The manner to remove the male connector 47 from the female connector 43 is not limited to the manner described below.

The tongue 84 is pinched by an operator, for example. The operator readily pinches the tongue 84 because the tongue 84 is free. When the tongue 84 is pulled in a direction along the Z axis, for example, the locking lever 57 is rotated. The fixing portion 60 pulls the expanded portion 81 of the locking lever 57 from the first position P1 toward the second position P2. In other words, the fixing portion 60 causes a force to act on the locking lever 57 to move the locking lever 57 from the first position P1 to the second position P2.

The sticking force of the fixing portion 60 to the expanded portion 81 is larger than a force for starting to rotate the locking lever 57. Thus, the fixing portion 60 keeps stuck on the expanded portion 81 even though the locking lever 57 is rotated by the fixing portion 60 pulling the expanded portion 81.

Pulling the expanded portion 81, the fixing portion 60 peels from the female connector 43. In other words, the fixing portion 60 is separated from the female connector 43.

Separating the fixing portion 60 from the female connector 43 leads to the movement of the locking lever 57 from the first position P1 to the second position P2. Separated from the female connector 43, the fixing portion 60 causes the locking lever 57 to move from the first position P1 to the second position P2.

Moving to the second position P2, the locking lever 57 disengages the female connector 43. The male connector 47 is removed from the female connector 43 by being pulled in a direction along the Y axis by an operator, for example.

Figure 12:
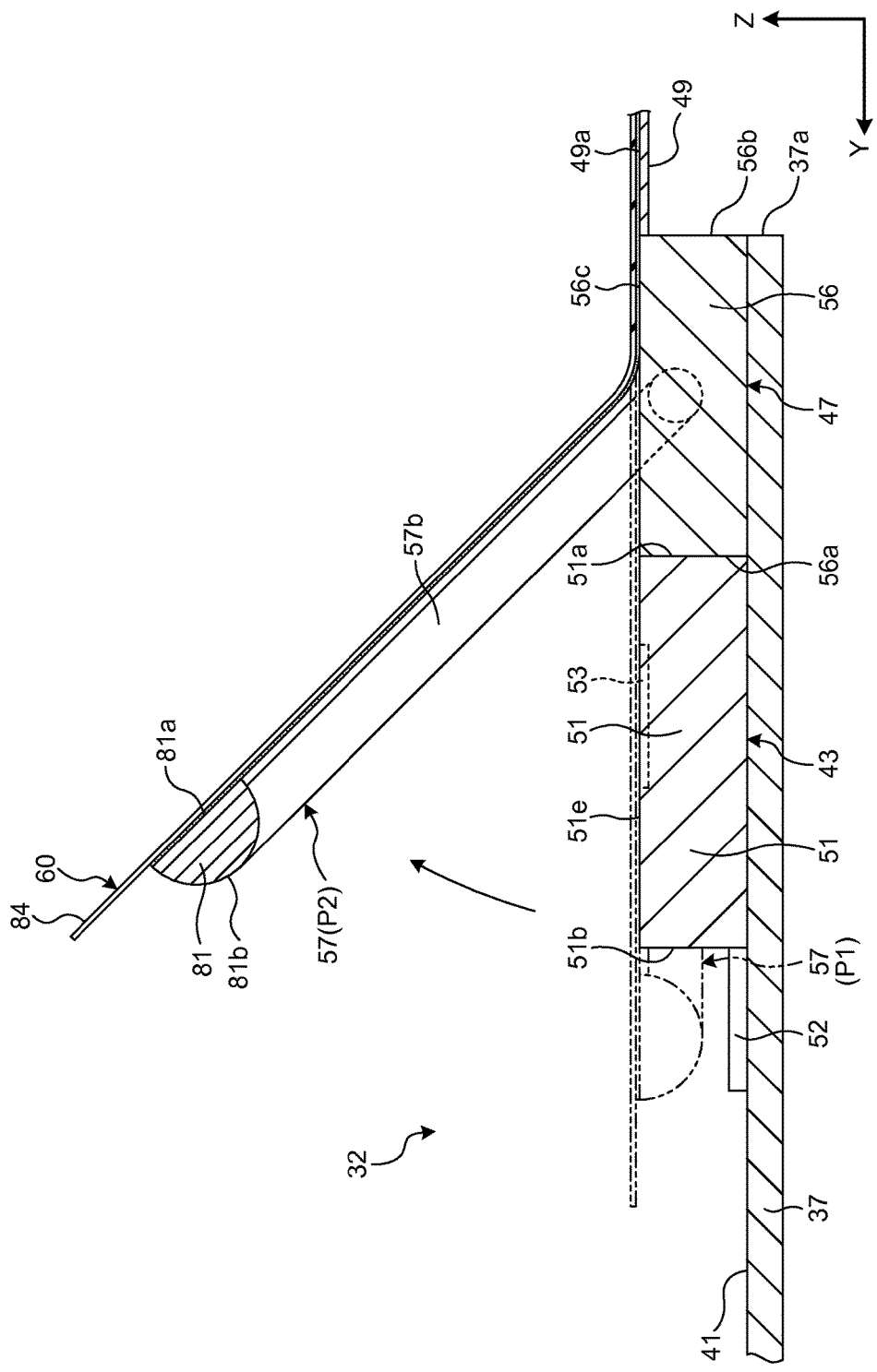
FIG. 12 is an exemplary cross-sectional view illustrating a portion of the display module in a state where the locking lever is at the second position, according to a sixth embodiment.

The following describes a sixth embodiment with reference to FIG. 12. FIG. 12 is a cross-sectional view illustrating a portion of the display module 32 in the state where the locking lever 57 is at the second position P2, according to the sixth embodiment. In FIG. 12, the locking lever 57 that is at the first position P1 is indicated with the chain double-dashed line.

As illustrated in FIG. 12, the expanded portion 81 in the sixth embodiment is integrated with the locking lever 57. The expanded portion 81 is a portion of the third portion 57c and is the portion expanded to be larger than another portion of the third portion 57c. The expanded portion 81 is not limited to this example. For example, the expanded portion 81 may have the same radius as that of another portion of the third portion 57c and may be bended to have a wave-like shape.

The upper face 81a of the expanded portion 81 is a plane in parallel with the upper face 51e of the first casing 51 in the state where the locking lever 57 is at the first position P1. The upper face 81a may be a curved surface. The fixing portion 60 is stuck on the upper face 81a.

When the male connector 47 is removed from the female connector 43, the tongue 84 is pulled in a direction along the Z axis by an operator, for example. Pulling the tongue 84 causes the locking lever 57 to move from the first position P1 to the second position P2 and the fixing portion 60 to be separated from the female connector 43.

Figure 13:
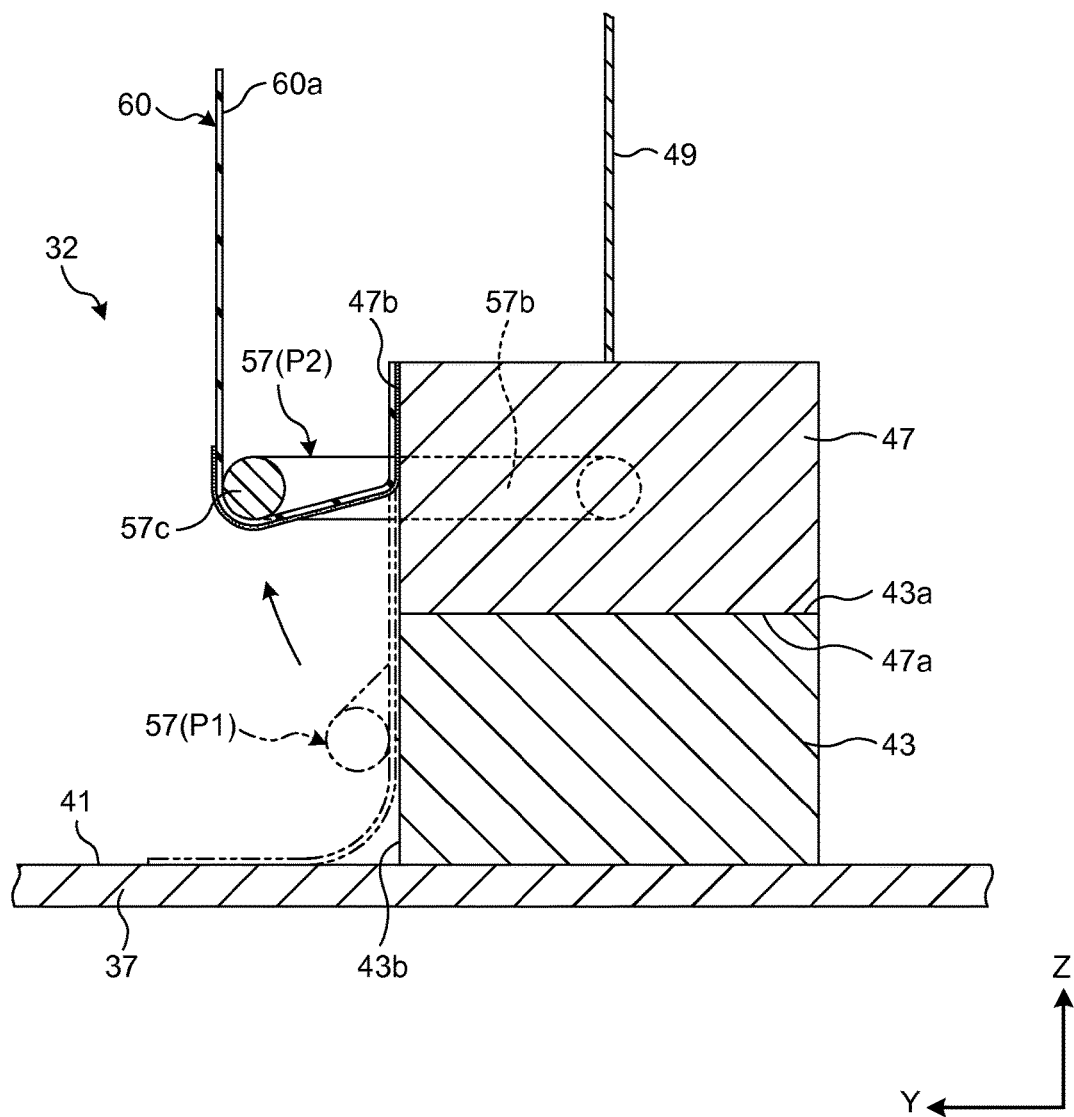
FIG. 13 is an exemplary cross-sectional view illustrating a portion of the display module in a state where the locking lever is at the second position, according to a seventh embodiment.

The following describes a seventh embodiment with reference to FIG. 13. FIG. 13 is a cross-sectional view illustrating a portion of the display module 32 in the state where the locking lever 57 is at the second position P2, according to the seventh embodiment. In FIG. 13, the locking lever 57 that is at the first position P1 is indicated with the chain double-dashed line.

As illustrated in FIG. 13 in the seventh embodiment, the male connector 47 is connected to the female connector 43 in a direction perpendicular to the mounting face 41 of the substrate 37. The male connector 47 may be connected to the female connector 43 at an angle other than the right angle.

The female connector 43 has an upper surface 43a and a side surface 43b. The upper surface 43a faces a side opposite the side facing the mounting face 41 of the substrate 37. The upper surface 43a is provided with the insertion inlet. The side surface 43b intersects the upper surface 43a.

The male connector 47 has a lower surface 47a and a side surface 47b. The lower surface 47a has the insertion portion. The male connector 47 is connected to the female connector 43 by insertion of the insertion portion into the insertion inlet of the female connector 43. The side surface 47b intersects the lower surface 47a. In the state where the male connector 47 is connected to the female connector 43, the side surface 47b faces in the same direction as the side surface 43b of the female connector 43 faces. The side surface 47b of the male connector 47 substantially continues from the side surface 43b of the female connector 43.

The locking lever 57 engages the female connector 43 in the state where the locking lever 57 is at the first position P1. For example, the stoppers provided to the female connector 43 engage the locking lever 57. The side surface 43b of the female connector 43 faces the third portion 57c of the locking lever 57 at the first position P1.

The fixing portion 60 fixes the male connector 47 to the female connector 43 by being stuck on the side surface 43b of the female connector 43 and the side surface 47b of the male connector 47. A portion of the fixing portion 60 is between the third portion 57c of the locking lever 57 at the first position P1 and the side surface 43b of the female connector 43.

In addition, the fixing portion 60 has a tip portion 60a extending along the mounting face 41 of the substrate 37. The tip portion 60a is not fixed to any other component, and is free. It is noted that, the tip portion 60a may be fixed to another component such as the substrate 37.

The male connector 47 is removed from the female connector 43 in the following manner, for example. The manner to remove the male connector 47 from the female connector 43 is not limited to the manner described below.

The tip portion 60a of the fixing portion 60 is pinched by an operator, for example. The operator readily pinches the tip portion 60a because the tip portion 60a is free. When the tip portion 60a is pulled in a direction along the Z axis, for example, the fixing portion 60 is peeled from the female connector 43.

The tip portion 60a of the fixing portion 60 is further pulled, resulting in the fixing portion 60 coming into contact with the third portion 57c of the locking lever 57. The fixing portion 60 pushes the third portion 57c of the locking lever 57 from the first position P1 toward the second position P2.

The fixing portion 60 lifts up the locking lever 57 and peels from the female connector 43 and the male connector 47. In other words, the fixing portion 60 is separated from the female connector 43.

Separating the fixing portion 60 from the female connector 43 leads to the movement of the locking lever 57 from the first position P1 to the second position P2. Separated from the female connector 43, the fixing portion 60 causes the locking lever 57 to move from the first position P1 to the second position P2.

Moving to the second position P2, the locking lever 57 disengages the female connector 43. The male connector 47 is removed from the female connector 43 by being pulled in a direction along the Z axis by an operator, for example.

According to at least one embodiment described above, the fixing portion fixes the first connector to the second connector. In addition, the fixing portion causes the engage portion to move from the first position to the second position by being separated from the second connector. The fixing portion thus configured to fix the first connector to the second connector and cause the engage portion to move reduces the number of components of the electronic device.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, in the embodiments described above, the fixing portion 60 is attached to the locking lever 57 with a double-sided adhesive tape or by being wound. The fixing portion may be attached to the engage portion by passing through a hole provided to the engage portion or being fastened to the engage portion with a member such as a pin.

What is claimed is:

1. An electronic device comprising:
   a first connector;
   a second connector comprising leads, the second connector being connected to the first connector;
   a substrate comprising a mounting face on which lands are provided, the lands being electrically coupled to the leads of the second connector;
   a locking lever comprising a first portion, a second portion, and a third portion, a first end of the first portion and a first end of the second portion being attached to both sides of the first connector, the third portion connecting a second end of the first portion and a second end of the second portion, the locking lever being movable between a first position where the locking lever engages with the second connector connected to the first connector and a second position where the locking lever disengages from the second connector to be able to remove the first connector from the second connector; and
   a fixing portion adhered to the first and the second connectors to fix the first connector to the second connector, and configured to move the locking lever from the first position to the second position when pulled apart from the second connector.

2. The electronic device of claim 1, further comprising a harness extending from the first connector, wherein
   a surface of the harness, an upper face of the first connector, and an upper face of the second connector form a flat face that faces oppositely to the mounting face.

3. The electronic device of claim 1, wherein the second connector comprises stoppers that protrude from both sides of the second connector,
   the locking lever catches the stoppers at the first position.

4. The electronic device of claim 1, wherein,
   the fixing portion comprises a first member and a second member,
   the first member comprises a first attaching portion and a second attaching portion,
   the second member is adhered to the first and second connectors and adhered to the second attaching portion, and
   the first attaching portion is wound around the locking lever at the first position.

5. The electronic device of claim 4, wherein, the locking lever is configured to be moved from the first position to the second position by pulling the second member apart from the second connector.

6. The electronic device of claim 4, wherein the second attaching portion continuously extends from the first attaching portion oppositely to the second connector.

7. The electronic device of claim 4, wherein the first attaching portion is located between the locking lever at the first position and the leads.

8. The electronic device of claim 4, wherein the first attaching portion insulates the locking lever from the leads and a wiring pattern provided on the mounting face.

9. The electronic device of claim 1, wherein the second connector comprises stoppers that protrude from both sides of the second connector and are separated from the mounting face,
   the locking lever catches the stoppers at the first position.

10. The electronic device of claim 4, wherein the first member and the second member have insulation property.

11. The electronic device of claim 10, wherein each of the first member and the second member comprises a flexible sheet.

* * * * *